United States Patent
Harris

(10) Patent No.: US 9,320,268 B1
(45) Date of Patent: Apr. 26, 2016

(54) CADDY ASSEMBLY

(71) Applicant: William J. Harris, Oakboro, NC (US)

(72) Inventor: William J. Harris, Oakboro, NC (US)

(*) Notice: Subject to any disclaimer, the term of this patent is extended or adjusted under 35 U.S.C. 154(b) by 120 days.

(21) Appl. No.: 14/096,266

(22) Filed: Dec. 4, 2013

(51) Int. Cl.
*A01K 97/10* (2006.01)

(52) U.S. Cl.
CPC .................... *A01K 97/10* (2013.01)

(58) Field of Classification Search
CPC ........................................ A01K 97/10
USPC ...................................... 43/21.2, 23
See application file for complete search history.

(56) References Cited

U.S. PATENT DOCUMENTS

| | | | | |
|---|---|---|---|---|
| 608,850 | A * | 8/1898 | Folmer | 248/188.5 |
| 2,752,115 | A * | 6/1956 | Green | 248/533 |
| 2,851,234 | A * | 9/1958 | Scheifele | 248/538 |
| 3,636,649 | A * | 1/1972 | Paiva | 43/21.2 |
| 3,906,653 | A * | 9/1975 | Williams | 43/21.2 |
| 4,043,070 | A * | 8/1977 | Lamothe | 43/21.2 |
| 4,177,595 | A * | 12/1979 | Chon | 43/21.2 |
| 4,311,262 | A | 1/1982 | Morin | |
| 4,827,654 | A * | 5/1989 | Roberts | 43/21.2 |
| 5,054,737 | A * | 10/1991 | DeLancey | 248/515 |
| 5,137,319 | A | 8/1992 | Sauder | |
| 5,367,815 | A * | 11/1994 | Liou | 43/21.2 |
| 5,678,348 | A | 10/1997 | Zielinski et al. | |
| 6,128,848 | A * | 10/2000 | Wong | 43/21.2 |
| 6,302,367 | B1 * | 10/2001 | Ratza et al. | 248/515 |
| 6,438,889 | B1 * | 8/2002 | Handy | 43/21.2 |
| 6,634,134 | B1 * | 10/2003 | Nyquist | 43/19.2 |
| 6,651,374 | B1 * | 11/2003 | Ridlen | 43/21.2 |
| 7,213,361 | B1 * | 5/2007 | Perigo, Sr. | 43/21.2 |
| D582,508 | S | 12/2008 | Alley | |
| 7,774,973 | B2 * | 8/2010 | Carnevali | 43/21.2 |
| 7,909,378 | B2 | 3/2011 | Alley | |
| 8,024,886 | B2 * | 9/2011 | Sutherland et al. | 43/21.2 |
| 8,453,372 | B1 * | 6/2013 | Moe | 43/21.2 |
| 8,943,739 | B2 * | 2/2015 | Blake, III | 43/54.1 |

* cited by examiner

*Primary Examiner* — Christopher P Ellis
*Assistant Examiner* — Michael Wang

(57) ABSTRACT

A caddy assembly for carrying a fishing rod includes a tripod that may be positioned on a support surface. A head is movably coupled to the tripod. The head is positionable at a selected angle with respect to the tripod. A handle is coupled to the head. The handle may be gripped. A carrier is coupled to the head. The carrier may carry a fishing rod.

14 Claims, 5 Drawing Sheets

CADDY ASSEMBLY

BACKGROUND OF THE DISCLOSURE

Field of the Disclosure

The disclosure relates to caddy devices and more particularly pertains to a new caddy device for carrying a fishing rod.

SUMMARY OF THE DISCLOSURE

An embodiment of the disclosure meets the needs presented above by generally comprising a tripod that may be positioned on a support surface. A head is movably coupled to the tripod. The head is positionable at a selected angle with respect to the tripod. A handle is coupled to the head. The handle may be gripped. A carrier is coupled to the head. The carrier may carry a fishing rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
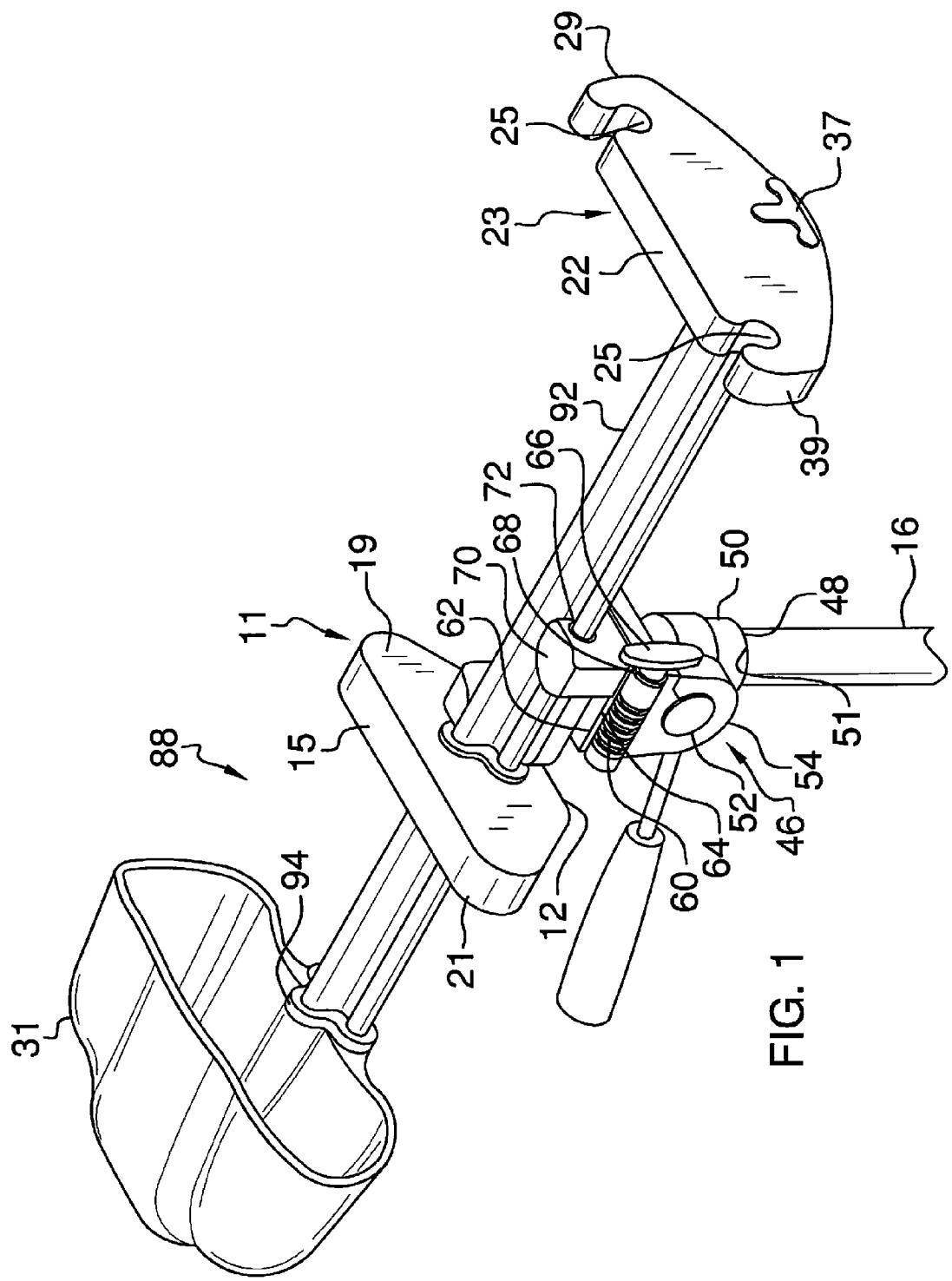
FIG. 1 is a perspective view of a caddy assembly according to an embodiment of the disclosure.
Figure 2:
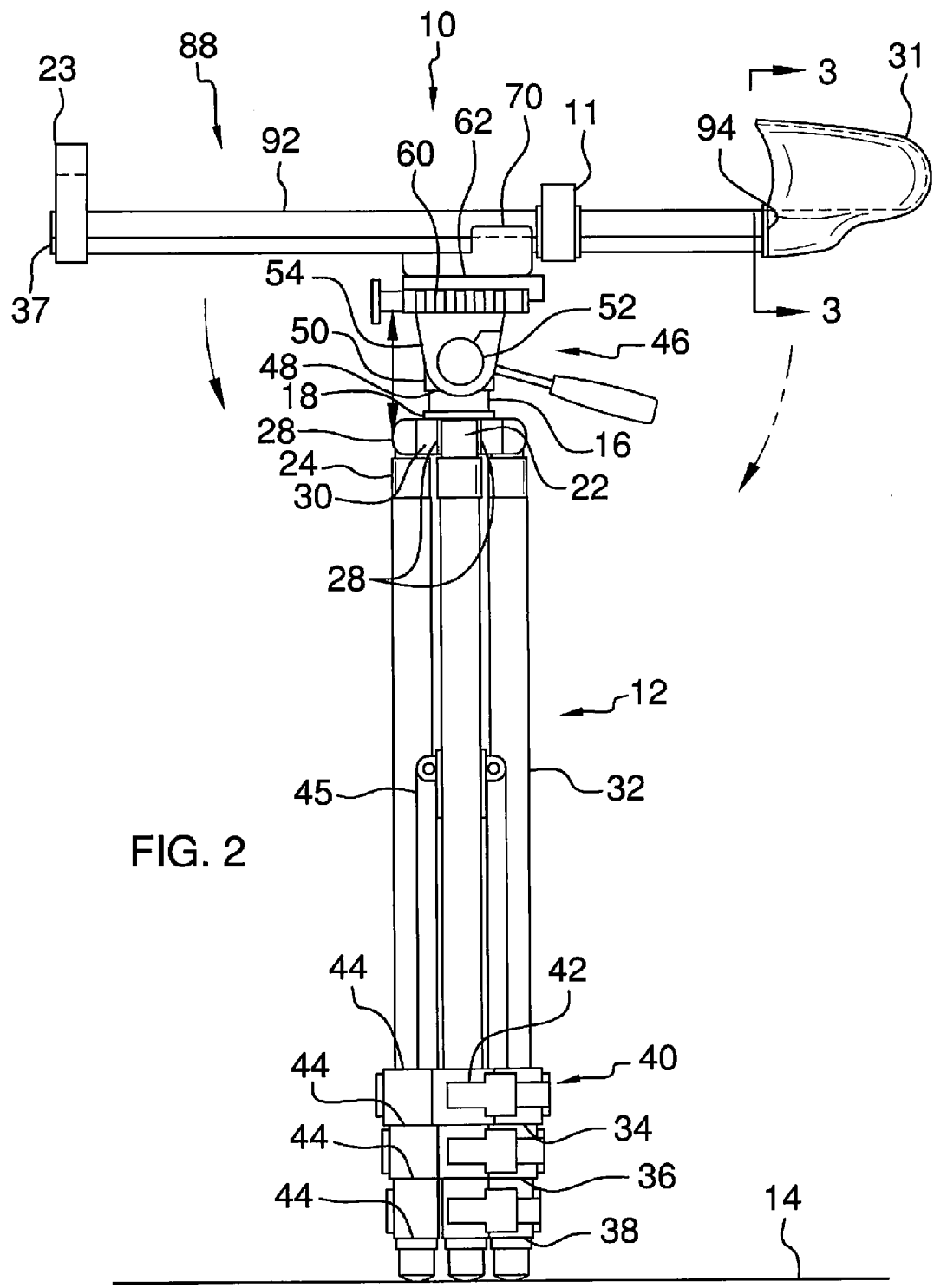
FIG. 2 is a right side view of an embodiment of the disclosure.
Figure 3:
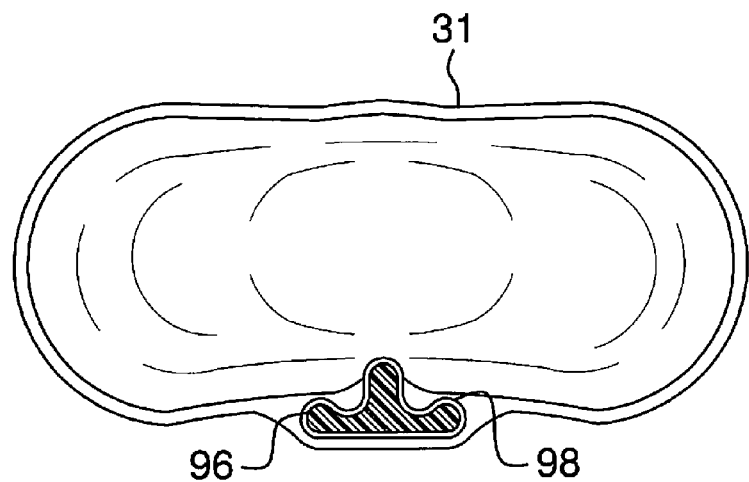
FIG. 3 is a cross sectional view of an embodiment of the disclosure.
Figure 4:
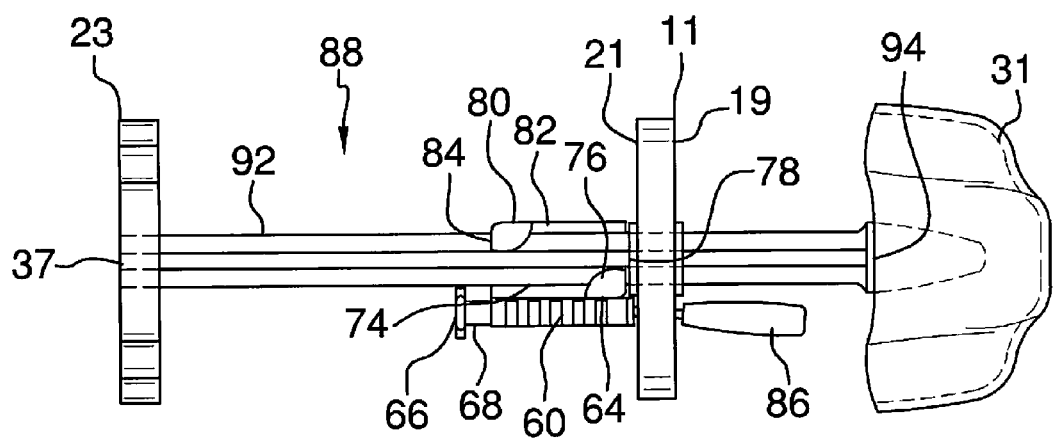
FIG. 4 is a top view of an embodiment of the disclosure.
Figure 5:
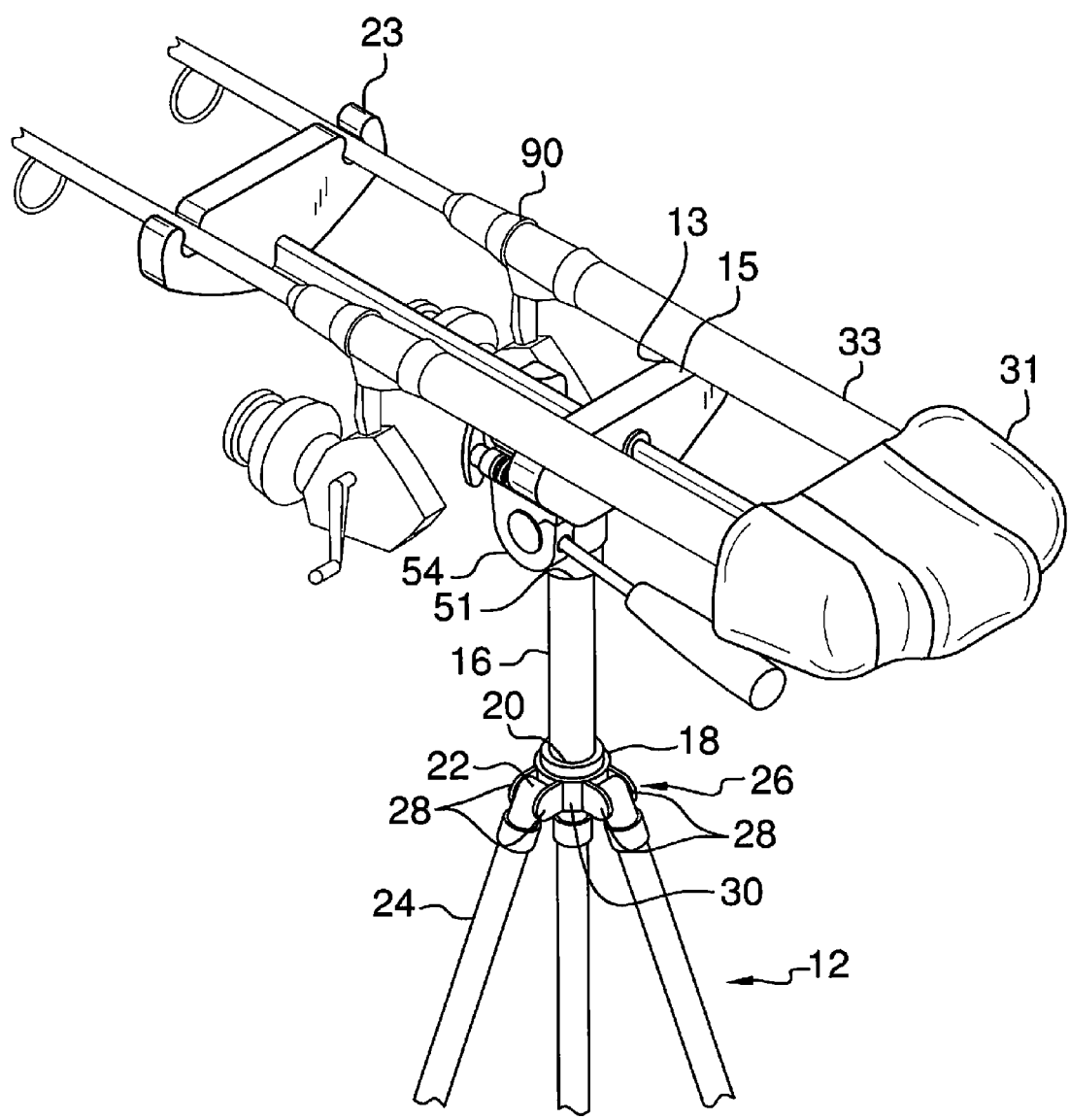
FIG. 5 is a top perspective view of an embodiment of the disclosure.

With reference now to the drawings, and in particular to FIGS. 1 through 6 thereof, a new caddy device embodying the principles and concepts of an embodiment of the disclosure and generally designated by the reference numeral 10 will be described.

As best illustrated in FIGS. 1 through 5, the caddy assembly 10 generally comprises a tripod 12 that may be positioned on a support surface 14. A central leg 16 of the tripod 12 is slidably coupled to a retainer 18. Continuing, the retainer 18 comprises a ring that may have an outside diameter between 7 cm and 10 cm. Moreover, the central leg 16 of the tripod 12 extends through a central opening 20 in the retainer 18. The central leg 16 of the tripod 12 may have a length between 12 cm and 18 cm.

A top end 22 of an outer leg 24 of the tripod 12 is hingedly coupled to a leg portion 26 of the retainer 18. Additionally, the leg portion 26 of the retainer 18 comprises a pair of spaced tabs 28 coupled to and extending outwardly from and outer side 30 of the retainer 18. The outer leg 24 of the tripod 12 has a telescopically adjustable length. Each of a top portion 32, an upper middle portion 34, a lower middle portion 36 and a bottom portion 38 of the outer leg 24 of the tripod 12 are extendable to a selected length. Lastly, the outer leg 24 of the tripod 12 may adjustable to a length between 60 cm and 100 cm.

A lock 40 is coupled to the outer leg 24 of the tripod 12. Further, a lever 42 is movably coupled to the lock 40. The lock 40 is one of a plurality of the locks 40. Each of the plurality of locks 40 is positioned proximate a bottom end 44 of each of an associated one of the top portion 32, the upper middle portion 34 and the lower middle portion 36 of the outer leg 24 of the tripod 12. The lever 42 selectively engages the outer leg 24 of the tripod 12. Moreover, the plurality of locks 40 selectively retains an associated one of the upper middle portion 34, lower middle portion 36 and the bottom portion 38 of the outer leg 24 of the tripod 12 at the selected length. Each outer leg 24 may have an associated stake 100 coupled to and extending from a bottom end 102 of the bottom portion 38 to facilitate secure positioning by insertion of each stake 100 into the support surface 14. Each stake 100 may be integrally attached to or removably coupled to the associated outer leg 24.

The outer leg 24 of the tripod 12 is one of a plurality of outer legs 24 of the tripod 12. Each of the outer legs 24 of the tripod 12 is hingedly coupled to an associated one of a plurality of the leg portions 26 of the retainer 18. Moreover, the plurality of leg portions 26 of the retainer 18 are each evenly distributed around the outer side 30 of the retainer 18. A plurality of arms 45 is each movably coupled between an associated one of the plurality of outer legs 24 of the tripod 12 and the central leg 16 of the tripod 12. The plurality of outer legs 24 of the tripod 12 is positionable in a deployed position so the plurality of arms 32 extends laterally between the plurality of outer legs 24 of the tripod 12 and the central leg of the tripod 12. Additionally, the plurality of outer legs 24 of the tripod 12 is positionable in a stored position so the plurality of outer legs 24 of the tripod 12 is coextensive with the central leg 16 of the tripod 12.

A head 46 is movably coupled to the tripod 12. A bottom side 48 of a coupling portion 50 of the head 46 is coupled to a top end 51 of the central leg 16 of the tripod 12. Moreover, the head 46 is positionable a selected distance away from the retainer 18. A pin 52 extends laterally through a tilting portion 54 of the head 46 and engages the coupling portion 50 of the head 46. Continuing, the tilting portion 54 of the head 46 is rotatable about a lateral axis extending through a first end 56 and a second end 58 of the pin 52.

A screw 60 extends laterally through a top side 62 of the tilting portion 54 of the head 46 proximate a first lateral side 64 of the tilting portion 54 of the head 46. Moreover, the screw 60 is coextensive with the first lateral side 64 of the tilting portion 54 of the head 46. The screw 60 selectively retains the tilting portion 54 of the head 46 at selected angle with respect to the coupling portion 50 of the head 46. Lastly, a grip 66 is coupled to a free end 68 of the screw 60.

A C-shaped retaining portion 70 of the head 46 is coupled to and extends upwardly from the top side 62 of the tilting portion 54 of the head 46. The C-shaped retaining portion 70 of the head 46 may have a height between 5 cm and 8 cm. An open side 72 of the C-shaped retaining portion 70 of the head 46 faces a center 74 of the tilting portion 54 of the head 46.

Moreover, the C-shaped retaining portion 70 of the head 46 is one of a pair of the C-shaped retaining portions 70 of the head 46. A first one of the pair of C-shaped retaining portions 76 of the head 46 is positioned proximate an intersection of the first lateral side 64 and a front side 78 of the tilting portion 54 of the head 46. A second one of the pair of C-shaped retaining portions 80 of the head 46 is positioned proximate an intersection of a second lateral side 82 and a back side 84 of the tilting portion 54 of the head 46.

A handle 86 is coupled to the head 46 so the handle 46 may be gripped. The handle 86 extends laterally away from the tilting portion 54 of the head 46. Additionally, the handle 86 may have a length between 12 m and 18 cm. The handle 86 may be used to position the tilting portion 54 of the head 46 at the selected angle.

A carrier 88 is coupled to the head 46. Moreover, the carrier 88 may carry a fishing pole 90. The fishing pole 90 may be of any conventional design. Additionally, the fishing pole 90 may be one of a pair of the fishing poles 90. The carrier 88 comprises a clover shaped member 92 elongated along a longitudinal axis extending through a first end 94 and a second end 37 of the clover shaped member 92. Further, the clover shaped member 92 may have a length between 60 cm and 90 cm. Each of a first lateral lobe 96 and a second lateral lobe 98 of the clover shaped member 92 engages an associated one of the pair of C-shaped retaining portions 76, 80 of the head 46 so the carrier 88 is retained on the head 46.

A support pad 11 is coupled to the clover shaped member 92. The support pad 11 is positioned closer to the first end 94 of the clover shaped member 92 than the second end 37 of the clover shaped member 92. Additionally, a bottom 13 of the fishing pole 90 abuts a top side 15 of the support pad 11. A bottom side 17 of the support pad 11 has a width that is less than a width of the top side 15 of the support pad 11. Moreover, the support pad 11 has a trapezoidal cross section taken along a longitudinal axis extending through a front side 19 and a rear side 21 of the support pad 11.

An end pad 23 is coupled to the second end 37 of the clover shaped member 92. A top side 27 of the end pad 23 is positioned above the clover shaped member 92. Moreover, a pair of grooves 25 extends downwardly into the top side 27 of the end pad 23 proximate an associated one of a first lateral side 39 and a second lateral side 29 of the end pad 23. The pair of grooves 25 each engages one of the pair of fishing rods 90 so each of the fishing rods 90 is retained on the carrier 88. A cup 31 is coupled to the first end 94 of the clover-shaped member 92. The cup 31 insertably receives a handle 33 of the fishing rods 90. The carrier 88 is positionable in a stored position so the clover shaped member 92 is coextensive with the central leg 16 of the tripod 12. Further, the carrier 88 is positionable in a deployed position to the clover shaped member 92 is oriented at a selected angle with respect to the central leg 16 of the tripod 12.

Figure 6:
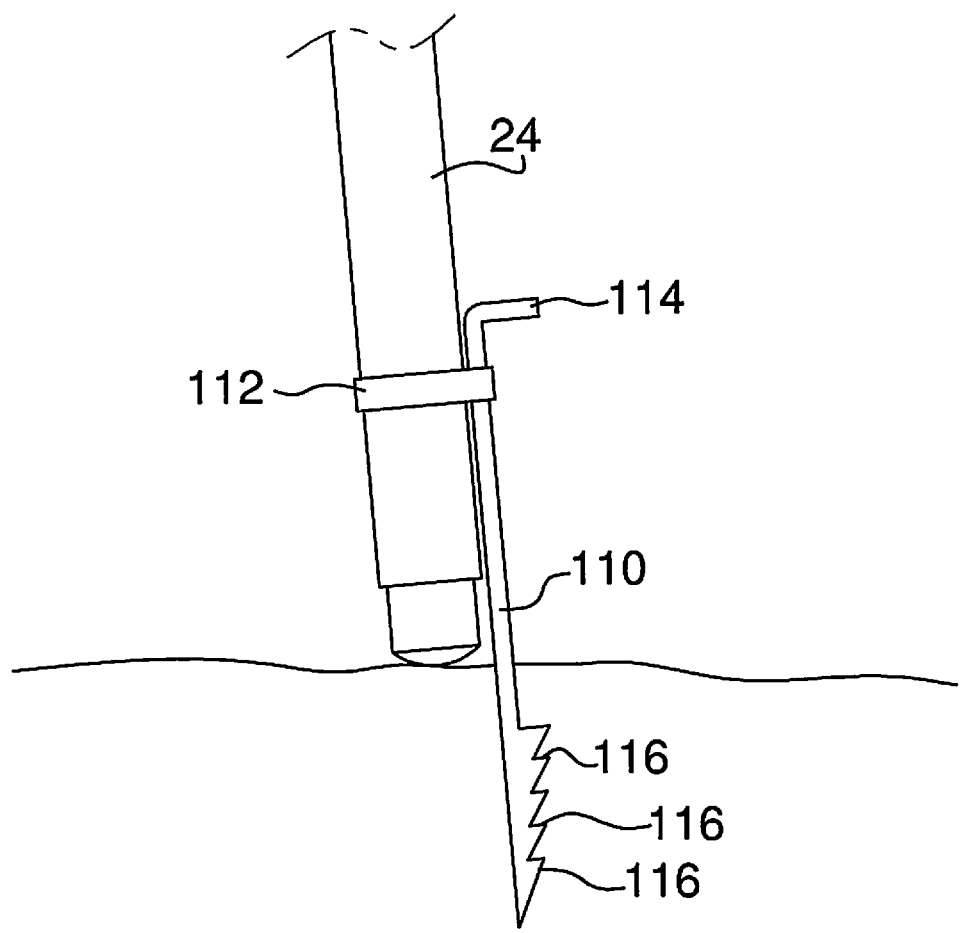
FIG. 6 is a detailed view of an embodiment of the disclosure.

As shown in FIG. 6, an alternative form of a stake 110 may be attached to each outer leg 24 by insertion of the stake 110 through a ring 112 linking the stake 110 to the associated leg 24. Each stake 110 may be elongated having a plurality of serrations 116 and have a protruding flange 114 to inhibit the ring 112 from inadvertently disengaging from the stake 110.

In use, the fishing rod 90 is positioned on the carrier 88 so the handle 33 of the fishing rod 90 is positioned in the cup 31 and a selected one of the pair of grooves 25 on the end pad 23 receives the fishing rod 90. The assembly 10 is used to carry the fishing rods 90 as well as to store the fishing rods 90. The plurality of outer legs 24 of the tripod 12 and the carrier 88 are positioned in the stored position to store the fishing rod 90. Moreover, the plurality of outer legs 24 of the tripod 12 is positioned in the deployed position and the carrier 88 is positioned in the deployed position when the fishing rod 90 is used for fishing. An end 35 of the fishing rod 90 is directed forwardly of the carrier 88 when the carrier 88 is positioned in the deployed position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A caddy assembly for carrying a fishing rod, said assembly comprising:
   a tripod configured to be positioned on a support surface;
   a head movably coupled to said tripod, said head being positionable at a selected angle with respect to said tripod;
   a handle coupled to said head wherein said handle is configured to be gripped; and
   a carrier coupled to said head wherein said carrier is configured to carry the fishing rod, said carrier comprising
      a clover shaped member, said clover shaped member being elongated, said clover shaped member having a clover shaped cross-sectional shape transverse to a longitudinal axis of said elongated member,
      an end pad coupled to a second end of said clover shaped member,
      a cup coupled to a first end of said clover-shaped member wherein said cup is configured for receiving a handle of the fishing rod, said cup being spaced from said end pad wherein said end pad and said cup are configured for supporting the fishing rod, and
      a support pad coupled to said clover shaped member, said support pad being positioned in spaced relationship to said cup and closer to said first end of said clover shaped member than said second end of said clover shaped member wherein said support pad is configured to support the fishing rod with said end pad and said cup.

2. The assembly according to claim 1 further comprising said tripod comprising a central leg of said tripod slidably coupled to a retainer wherein said central leg of said tripod extends through a central opening in said retainer.

3. The assembly according to claim 2 further comprising a top end of an outer leg of said tripod being hingedly coupled to a leg portion of said retainer.

4. The assembly according to claim 3 further comprising said outer leg of said tripod having a telescopically adjustable length wherein each of a top portion, an upper middle portion, a lower middle portion and a bottom portion of said outer leg of said tripod are extendable to a selected length.

5. The assembly according to claim 1 further comprising a lock coupled to an outer leg of said tripod.

6. The assembly according to claim 5 further comprising said lock being one of a plurality of said locks.

7. The assembly according to claim 6 further comprising each of said plurality of locks being positioned proximate a bottom end of an associated one of a top portion, an upper middle portion and a lower middle portion of said outer leg of said tripod wherein said plurality of locks selectively retains an associated one of the upper middle portion, lower middle portion and a lower portion of said outer leg of said tripod at a selected length.

8. The assembly according to claim 3 further comprising said outer leg of said tripod being one of a plurality of outer legs of said tripod each being hingedly coupled to an associated one of a plurality of leg portions of said retainer.

9. The assembly according to claim 1 further comprising a coupling portion of said head being coupled to a top end of a central leg of said tripod wherein said head is positionable a selected distance away from a retainer.

10. The assembly according to claim 1 further comprising a pin extending through a tilting portion of said head and engaging a coupling portion of said head wherein said tilting portion of said head is rotatable about a lateral axis extending through a first end and a second end of said pin.

11. The assembly according to claim 1 further comprising:
a C-shaped retaining portion of said head coupled to and extending upwardly from a top side of a tilting portion of said head such that an open side of said C-shaped retaining portion of said head faces a center of said tilting portion of said head;
said C-shaped retaining portion of said head being one of a pair of said C-shaped retaining portions of said head;
a first one of said pair of C-shaped retaining portions of said head being positioned proximate an intersection of a first lateral side and a front side of said tilting portion of said head; and
a second one of said pair of C-shaped retaining portions of said head being positioned proximate an intersection of a second lateral side and a back side of said tilting portion of said head.

12. The assembly according to claim 1 further comprising each of a first lateral lobe and a second lateral lobe of said clover shaped member engaging an associated one of a pair of C-shaped retaining portions of said head wherein said clover shaped member is retained on said head.

13. The assembly according to claim 1 further comprising a pair of grooves extending downwardly into a top side of said end pad proximate an associated one of a first lateral side and a second lateral side of said end pad.

14. A caddy assembly for carrying a fishing rod, said assembly comprising:
a tripod configured to be positioned on a support surface, said tripod comprising;
a central leg of said tripod slidably coupled to a retainer wherein said central leg of said tripod extends through a central opening in said retainer;
a top end of an outer leg of said tripod being hingedly coupled to a leg portion of said retainer, said outer leg of said tripod having a telescopically adjustable length wherein each of a top portion, an upper middle portion, a lower middle portion and a bottom portion of said outer leg of said tripod are extendable to a selected length;
a lock coupled to said outer leg of said tripod, said lock being one of a plurality of said locks, each of said plurality of locks being positioned proximate a bottom end of an associated one of said top portion, said upper middle portion and said lower middle portion of said outer leg of said tripod wherein said plurality of locks selectively retains an associated one of the upper middle portion, lower middle portion and said lower portion of said outer leg of said tripod at the selected length;
said outer leg of said tripod being one of a plurality of outer legs of said tripod each being hingedly coupled to an associated one of a plurality of said leg portions of said retainer;
a head movably coupled to said tripod, said head comprising;
a coupling portion of said head coupled to a top end of said central leg of said tripod wherein said head is positionable a selected distance away from said retainer;
a pin extending through a tilting portion of said head and engaging said coupling portion of said head wherein said tilting portion of said head is rotatable about a lateral axis extending through a first end and a second end of said pin;
a C-shaped retaining portion of said head coupled to and extending upwardly from a top side of said tilting portion of said head such that an open side of said C-shaped retaining portion of said head faces a center of said tilting portion of said head, said C-shaped retaining portion of said head being one of a pair of said C-shaped retaining portions of said head;
a first one of said pair of C-shaped retaining portions of said head being positioned proximate an intersection of a first lateral side and a front side of said tilting portion of said head;
a second one of said pair of C-shaped retaining portions of said head being positioned proximate an intersection of a second lateral side and a back side of said tilting portion of said head;
a handle coupled to said head wherein said handle is configured to be gripped by a user; and
a carrier coupled to said head wherein said carrier is configured to carry the fishing pole, said carrier comprising
a clover shaped member, said clover shaped member being elongated, said clover shaped member having a clover shaped cross-sectional shape transverse to a longitudinal axis of said elongated member, each of a first lateral lobe and a second lateral lobe of said clover shaped member engaging an associated one of said pair of C-shaped retaining portions of said head wherein said carrier is retained on said head,
an end pad coupled to a second end of said clover shaped member,
a pair of grooves extending downwardly into a top side of said end pad proximate an associated one of a first lateral side and a second lateral side of said end pad,
a cup coupled to a first end of said clover-shaped member wherein said cup is configured for receiving a handle of the fishing rod, said cup being spaced from said end pad wherein said end pad and said cup are configured for supporting the fishing rod, and
a support pad coupled to said clover shaped member, said support pad being positioned in spaced relationship to said cup and closer to the first end of said clover shaped member than the second end of said clover shaped member wherein said support pad is configured to support the fishing rod with said end pad and said cup.

* * * * *